United States Patent Office 2,799,703
Patented July 16, 1957

2,799,703

MANUFACTURE OF PROPIOLIC ACID

Irwin J. Pachter, Oak Park, Mich., assignor to Ethyl Corporation, New York, N. Y., a corporation of Delaware No Drawing. Application October 29, 1954,
Serial No. 465,728

6 Claims. (Cl. 260—526)

This invention relates to the manufacture of organic acids and, in particular, is concerned with the preparation of propiolic acid by reaction of carbon dioxide with alkali metal acetylides.

It has long been known that propiolic acid can be prepared by the reaction of carbon dioxide with the alkali metal acetylides, for example, sodium acetylide. The akali metal acetylides themselves are unique in contrast to the higher homologues in such a reaction since different problems are presented. For example, it is known that the substituted alkali metal acetylides react with carbon dioxide quite readily under atmospheric conditions. In contrast, reaction of sodium acetylide per se or other unsubstituted alkali metal acetylides with carbon dioxide requires a high pressure operation in order to obtain appreciable yields of propiolic acid. Certain improvements have been made with respect to the preparation of propiolic acid by this method which include conducting the carboxylation in the presence of volatile liquid diluents, such as liquid ammonia, hydrocarbons, and the ethers. The sodium acetylide in these prior art processes is in the form of a suspension or slurry in the aforementioned diluents. However, these processes are not satisfactory for commercial operation. The principal disadvantage is that prolonged reaction times on the order of about 10 to over 100 hours are required in order to obtain satisfactory yields. Such operations are impractical for the production of propiolic acid in appreciable quantities and a solution to the problem would be highly beneficial to the art.

Another procedure for the preparation of propiolic acid employs alkali metal-naphthalene addition compounds as the starting material. By this method, an alkali metal, for example, sodium, in the presence of a glycol ether is reacted with naphthalene to produce 1,4-disodio-naphthalene and acetylene is passed through this mixture to produce sodium acetylide. The sodium acetylide thus produced is colloidal. Carbon dioxide is then passed into the mixture to produce sodium propiolate which is converted to propiolic acid. This process suffers the disadvantage of being very costly and impractical when attempts are made to convert it to large-scale operation. Further, since the sodium acetylide is colloidal, it cannot be conveniently concentrated for later reaction. Likewise, the salt of propiolic acid produced is colloidal, thus requiring costly means of separation.

It is, therefore, an object of the present invention to provide a new and improved process for the manufacture of propiolic acid. A particular object of this invention is to provide a process for the production of propiolic acid, wherein, shorter reaction times than those required by the prior art processes are employed, while still obtaining high yield and purity. The above and other objects of this invention will be apparent from the description hereinafter.

An improved process for the production of propiolic acid has now been discovered which comprises reacting carbon dioxide for a period not more than about six hours under superatmospheric pressure with an alkali metal acetylide suspended in a medium having the formula:

$$(R)_{4-n}\text{—C—}(OR')_n$$

wherein, R can be the same or different and is selected from the group consisting of hydrogen and monovalent hydrocarbon radicals, R' is a monovalent hydrocarbon radical, and $n$ is a small whole number from 2 to 4, inclusive. The alkali metal salt of propiolic acid thus obtained is readily removed from the reaction mixture by mechanical means, such as filtration and the like and then converted to the acid by acidification. Alternatively, the alkali metal salt can be converted to the free acid in the reaction mixture and then the free acid isolated. The former is the preferred procedure in order to obviate decomposition of the diluent by the acid. The proportion of the diluent is at least sufficient to provide a medium which can be efficiently agitated. The reaction can be conducted at a temperature considerably below 0° C. as about −60° C. up to about 100° C. and the pressure can be varied from atmospheric to about 2000 p. s. i. and higher. Temperatures above 100° C. should be avoided since a violent reaction may take place. Best results are obtained when the temperature is maintained between about 20 to 55° C. and the pressure is between about 400–1000 p. s. i. The preferable reaction time is between 3 and 6 hours. Within this period the reaction proceeds to completion and longer reaction periods are to no advantage. Shorter reaction periods can be employed but result in lower yield.

The process of my invention has particular advantage in that shorter reaction times are required than those required by the prior art processes. Surprisingly, the reaction time for complete reaction has been reduced to less than one-third the time required by the prior art processes. Such a reduction in time thus permits the preparation of propiolic acid in high yield and purity in a manner more attractive to commercial application. A further advantage is that when employing these shorter reaction times, unexpectedly higher yields are obtained by my process than are obtained by the previously known methods for the same reaction time and, in most instances, even when employing the longer reaction times of the prior art processes.

As stated above, the process of this invention comprises reacting the alkali metal acetylides with carbon dioxide while suspended in a diluent having the following formula:

$$(R)_{4-n}\text{—C—}(OR')_n$$

wherein, R is selected from the group consisting of hydrogen and monovalent hydrocarbon radicals, R' is a monovalent hydrocarbon radical, and $n$ is a small whole number from 2 to 4, inclusive. The diluent which I employ is characterized principally in that at least two oxygen-containing radicals are attached to a single carbon atom by means of carbon to oxygen single bonds. As mentioned, the radical R can be hydrogen or a monovalent hydrocarbon radical. The term "monovalent hydrocarbon radical" denotes a univalent aliphatic, alicyclic, or aromatic radical which can be further substituted. By the term "univalent aliphatic radical" is intended a univalent radical derived from an open chain saturated or unsaturated carbon compound. The term "univalent alicyclic radical" denotes a univalent radical derived from the corresponding aliphatic compounds from which a hydrogen atom has been removed.

Thus, when the substituent "R" of the diluents of this invention are univalent aliphatic radicals, I employ radicals, such as the alkyl radicals: methyl, ethyl, isopropyl, sec-butyl, n-amyl, and various positional isomers as, for example, 1,2-dimethylpropyl and, likewise, the corresponding straight or branched chain isomers of hexyl, heptyl, and the like, up to about eicosyl. Moreover, such monovalent aliphatic radicals can be alkenyl radicals such as, for example, vinyl, isopropenyl, $\Delta^2$-butenyl, and the like, and their corresponding branched chain isomers and other alkenyl radicals, such as, for example, hexenyl up to about eicosenyl and their corresponding branched chain isomers. Further, such monovalent hydrocarbon constituents can be aralkyl radicals as, for example, benzyl, $\alpha$-phenylethyl, $\beta$-phenylpropyl, $\gamma$-phenylbutyl, and the like, and $\alpha'$-naphthylmethyl, $\alpha$-($\alpha'$-naphthyl)-ethyl, and the like. Moreover, the univalent aliphatic radical or radicals can be aralkenyl radicals, such as, for example, $\alpha$-phenylvinyl, $\beta$-phenyl-$\Delta^1$-propenyl, $\gamma$-phenylisopropenyl, and similarly the phenyl derivatives of the isomers of butenyl, pentenyl, and the like. Other such aryl alkenyl radicals include $\alpha$-($\alpha'$-naphthyl)-vinyl, $\beta$-($\alpha'$-naphthyl)-vinyl, $\beta$ - ($\beta'$-naphthyl)-isopropenyl, and the like. When the monovalent hydrocarbon radical is a univalent alicyclic radical or radicals, these are selected from the group consisting of cycloalkyl and cycloalkenyl radicals. Thus, for example, they can be the cycloalkyl radicals cyclobutyl, cycloamyl, cyclopropyl, and the like, and such cycloalkyl radicals as $\alpha$-cyclopropylethyl, $\gamma$-cyclobutylpropyl, and the like. Similarly, the alicyclic radicals can be cycloalkenyl radicals such as, for example, $\alpha$-cyclohexyl vinyl, $\gamma$-cycloheptyl-$\Delta^1$-propenyl, $\beta$-cyclononyl isopropenyl, and the like. When the monovalent hydrocarbon radical is a univalent aromatic radical or radicals, these are selected from the group consisting of aryl and alkaryl radicals. For example, I employ aryl radicals such as phenyl, $\alpha$-naphthyl, $\beta$-naphthyl, $\alpha$-anthryl, and the like. Moreover, the univalent aromatic radical can be an alkaryl radicals, such as, for example, o-, m-, or p-tolyl; 2,3-xylyl; 2,5-xylyl; 3,5-xylyl; and the like, or o-ethyl phenyl, 2-methyl-1-naphthyl, 5-methyl-1-naphthyl, 8-methyl-1-naphthyl, and the like. The foregoing is merely a representative list of the monovalent hydrocarbon radicals which I employ. Other examples will be evident.

Similarly, the radical R' is a monovalent hydrocarbon radical. The monovalent hydrocarbon radicals described previously with respect to the substituent R are likewise employed for R'. The monovalent hydrocarbon radicals which I prefer to employ as the radicals R and R' are those having less than about five carbon atoms since these are more volatile, easily removed from the reaction mixture, and are better solvents for carbon dioxide. A further criterion of the diluent to be employed is that it be a liquid under reaction conditions and preferably at room temperature, e. g., about 25° C. Another criterion of choice of the diluent is that it be essentially inert to the reactants. It is preferred that the subscript "n" be 2 since the compounds thereby described are better solvents for carbon dioxide, more stable, and less reactive toward the reactants. Thus, diluents coming within this description include, for example, methylal; acetal; butylal; and the like; and 1-methoxy-1-phenoxyethane; 1,1-dimethoxy-1-phenylethane; and the like. It is to be understood that mixtures of the diluents previously described can be employed rather than the pure compounds themselves. For example, a mixture of methylal and acetal is suitable. The diluents I especially prefer are methylal and acetal or mixtures thereof, primarily because of superior results and greater availability.

The proportion of the diluent is not critical. It should, however, be in a quantity sufficient to achieve a mobile reaction medium. That is, the reaction mixture can be efficiently agitated by ordinary mechanical means and the alkali metal acetylide in the diluent is in the form of a slurry. Generally, at least three parts of the diluent per part by weight of the alkali metal acetylide are preferred and ordinarily not more than about five parts of the diluent per part by weight of the acetylide are employed. Less than three parts of the diluent per part by weight of the acetylide can be employed, however, the reaction mixture is lumpy and efficient agitation cannot be accomplished. Further, the yield will be reduced.

The alkali metal acetylides are intended to include sodium acetylide, lithium acetylide, potassium acetylide, and the like acetylides of the group I metals. Primarily because of greater availability and economy, sodium acetylide is preferred. The acetylides are conveniently prepared by reaction of the metal with acetylene in liquid ammonia with or without pretreating with hydrated ferric nitrate or by the direct reaction of acetylene with the molten alkali metal. These procedures are the preferred methods of preparation of the alkali metal acetylides. Likewise, certain alkali metal derivatives can be employed for reaction with acetylene to prepare the acetylide as, for example, sodium hydride. Other methods of preparation will be evident to those skilled in the art.

The following typifies the procedure employed according to the process of this invention. A solution of sodium in liquid ammonia is prepared. While being agitated, purified dry acetylene is passed through the solution resulting in the formation of sodium acetylide. Then a diluent of this invention, as for example, methylal, is added to the mixture and substantially all of the ammonia is removed by vaporization. Carbon dioxide is then introduced into the reaction vessel under pressure to produce the salt of propiolic acid. At the completion of the reaction the alkali metal propiolate is readily recovered from the reaction mixture. Such recovery can be accomplished by distilling a substantial proportion of the diluent from the product, or the salt can be separated by filtration or the like methods. The salt is then acidified in a conventional manner to obtain the product acid. The process is equally adaptable to continuous, semi-continuous, or batch operation.

According to the process of this invention, the reaction time required is considerably reduced in comparison to the reaction times required by the prior art processes. Generally, the reaction time is less than about six hours with best results being obtained with the reaction time between about 3 to 6 hours. Reaction times exceeding about six hours should be avoided in order to prevent the formation of undesirable by-products. Times less than about one hour can be employed, however, the yield will be reduced.

To further describe the process of this invention, the following examples are presented, wherein, unless otherwise specified, all parts are by weight.

*Example 1*

Sodium acetylide was prepared according to the procedure of Greenlee and Henne, Inorganic Synthesis, vol. II, McGraw-Hill, 1946. A suspension of 48 parts of the sodium acetylide in 200 parts of methylal was added to an autoclave. The air in the autoclave was displaced with carbon dioxide and the latter was pressurized into the autoclave to 800 p. s. i. at such a rate that the temperature remained at between about 20 to 32° C. While under this pressure and temperature, the reaction mixture was agitated for 4½ hours. At the end of this period, the pressure was released and the contents of the autoclave were filtered, the solid product air dried, and immediately dissolved in 160 parts of water. The crude sodium propiolate was not permitted to remain in a dry state for an appreciable length of time since it may decompose explosively. The aqueous solution was acidified with a solution of 60 parts of sulfuric acid dissolved in about 75 parts of water, the solution being precooled between about 15 to 20° C. The acidified solution was then extracted continuously with ether to remove the propiolic acid therefrom. The ether was removed and dried over magnesium sulfate. Distillation of the residual liquid yielded 49.3 parts of propiolic acid having a boiling point of 70–75° C. at 50-mm. pressure and a residue of about 8 parts (10%) of crude acetylene dicarboxylic acid. The purity of the propiolic acid was 96% and the yield was 68%.

*Example II*

This run was conducted essentially the same as described in the previous example, except that the pressure employed was 400 p. s. i., the temperature was 40–50° C., the reaction time was three hours, and the slurry employed was 48 parts of sodium acetylide in 400 parts of methylal. The yield obtained was 37 parts of propiolic acid representing a 50% yield of 95% pure propiolic acid.

*Example III*

A yield of propiolic acid greater than 70% is obtained when a slurry of sodium acetylide in acetal is reacted with carbon dioxide for a period of six hours at 800 p. s. i. and a temperature between 40–50° C.

*Example IV*

A slurry of lithium acetylide reacted essentially as described in Example I with carbon dioxide produces a high yield of propiolic acid.

*Example V*

A slurry of sodium acetylide in 1,1-dimethoxy-1-phenylethane reacted with carbon dioxide at a temperature between about 35–45° C., a pressure of about 600 p. s. i., essentially as described in Example I, produces propiolic acid in high yield and purity.

Similarly, good results are obtained when the diluents hereinbefore described are substituted for the diluents employed in the above and other examples. Likewise, good results are obtained when the other alkali metal acetylides are employed as, for example, potassium acetylide and the like. It is likewise to be understood that the temperature and pressure can be varied over the limits hereinbefore described.

In contrast to the results obtained by my process, the following examples will describe the results obtained when employing the diluents taught by the prior art.

*Example VI*

A slurry of sodium acetylide in dioxane was reacted essentially the same as described in Example I, except that the pressure employed was 760 p. s. i. and the temperature was 32° C. The reaction time was 4½ hours. Eight parts of 83% propiolic acid were obtained representing a yield of 9.5%.

*Example VII*

Employing liquid ammonia as the diluent when sodium acetylide was reacted with carbon dioxide at a pressure of 14 p. s. i. and a temperature of −38° C. for a period of two hours, 9.6 parts of 97% propiolic acid were obtained representing a yield of 13%.

Similarly, when a hydrocarbon is employed as the diluent as, for example, kerosene, in order to obtain a similar yield to that obtained by the process of this invention, the reaction under similar conditions must be conducted for a period of more than 30 hours.

From the above results it can be readily seen that by the process of this invention the reaction time is reduced to a considerable extent while still obtaining high yields of high purity product.

The process provides an efficient and economical means for the preparation of propiolic acid. Propiolic acid finds considerable utility as an intermediate in the preparation of other chemicals, for example, by hydrogenation, in the formation of acrylic acid. Likewise, it can be used as an intermediate in the preparation of pharmaceuticals as, for example, chloroquine and sulfadiazine. These and other uses will be evident to those skilled in the art.

Having thus described the process of this invention, it is not intended that it be limited except as noted in the appended claims.

I claim:

1. A process for preparing propiolic acid which comprises reacting carbon dioxide under superatmospheric pressure with a suspension of an alkali metal acetylide for a period of less than about six hours in a medium, liquid under reaction conditions and essentially inert to the reactants, having the formula:

$$(R)_{4-n}\text{—}C\text{—}(OR')_n$$

wherein, R is selected from the group consisting of hydrogen and monovalent hydrocarbon radicals, R' is a monovalent hydrocarbon radical, and n is a small whole number from 2 to 4, inclusive.

2. A process for preparing propiolic acid which comprises reacting carbon dioxide under superatmospheric pressure with a suspension of an alkali metal acetylide for a period not greater than six hours in a medium, liquid under reaction conditions and essentially inert to the reactants, having the formula:

$$(R)_{4-n}\text{—}C\text{—}(OR')_n$$

wherein, R is selected from the group consisting of hydrogen and monovalent hydrocarbon radicals, R' is a monovalent hydrocarbon radical, and n is a small whole number from 2 to 4, inclusive, converting the salt of propiolic acid thus obtained to the free acid and recovering said free acid.

3. The process of claim 2 wherein said monovalent hydrocarbon radicals are radicals having less than about 5 carbon atoms.

4. A process for preparing propiolic acid which comprises reacting carbon dioxide at a pressure between about 400–1000 p. s. i., a temperature between about 20–55° C., with a slurry of sodium acetylide in methylal for a period between about 3–6 hours.

5. A process for preparing propiolic acid which comprises reacting sodium with acetylene while suspended in liquid ammonia to form sodium acetylide, adding methylal to the reaction mixture and evaporating the ammonia therefrom, and then introducing carbon dioxide under a pressure of 400–1000 p. s. i. and maintaining the reaction mixture at a temperature between about 20–55° C. for a period between about 3–6 hours, separating the sodium propiolate thereby obtained and converting it to the free acid.

6. The process of claim 5 wherein between about three to five parts by weight of methylal are present per part by weight of sodium acetylide.

References Cited in the file of this patent

UNITED STATES PATENTS 2,194,363    Macallum _____ Mar. 19, 1940
2,205,885    Jackson et al. _____ June 25, 1940